US010720270B2

(12) United States Patent
Robinson et al.

(10) Patent No.: US 10,720,270 B2
(45) Date of Patent: Jul. 21, 2020

(54) MAGNETIC FLOOR SURFACE

(71) Applicant: !OBAC Limited, Guernsey (GB)

(72) Inventors: Ian Robinson, North Yorkshire (GB);
Wayne Jobling, North Yorkshire (GB);
Ian Spreadborough, Windsor (GB);
Derek Smyth, Essex (GB)

(73) Assignee: !OBAC Limited, Guernsey (GB)

( * ) Notice: Subject to any disclaimer, the term of this patent is extended or adjusted under 35 U.S.C. 154(b) by 176 days.

(21) Appl. No.: 15/793,420

(22) Filed: Oct. 25, 2017

(65) Prior Publication Data
US 2018/0047486 A1 Feb. 15, 2018

Related U.S. Application Data

(62) Division of application No. 14/406,429, filed as application No. PCT/EP2013/061285 on May 31, 2013.

(30) Foreign Application Priority Data

Jun. 6, 2012 (EP) ..................................... 12171106

(51) Int. Cl.
H01F 1/01 (2006.01)
C09D 7/61 (2018.01)
E04F 15/02 (2006.01)
E04F 15/12 (2006.01)
C08G 18/73 (2006.01)
C08G 18/79 (2006.01)
C04B 26/16 (2006.01)
C04B 41/00 (2006.01)
C04B 41/48 (2006.01)
C08G 18/38 (2006.01)
C04B 41/63 (2006.01)
C08G 18/10 (2006.01)
C08K 3/22 (2006.01)
C04B 111/00 (2006.01)
C04B 111/60 (2006.01)

(52) U.S. Cl.
CPC .............. H01F 1/01 (2013.01); C04B 26/16 (2013.01); C04B 41/009 (2013.01); C04B 41/4884 (2013.01); C04B 41/63 (2013.01); C08G 18/10 (2013.01); C08G 18/3821 (2013.01); C08G 18/73 (2013.01); C08G 18/798 (2013.01); C09D 7/61 (2018.01); E04F 15/02144 (2013.01); E04F 15/12 (2013.01); C04B 2111/00267 (2013.01); C04B 2111/00422 (2013.01); C04B 2111/00482 (2013.01); C04B 2111/60 (2013.01); C08K 3/22 (2013.01); C08K 2201/01 (2013.01); Y10T 428/31609 (2015.04)

(58) Field of Classification Search
CPC ..... C04B 26/16; C04B 20/008; C04B 41/009; C04B 41/4884; C04B 41/4578; C04B 41/5096; C04B 41/5144; C04B 41/63; C04B 14/308; C04B 14/34; C04B 28/02; C04B 2111/00267; C04B 2111/00422; C04B 2111/00482; C04B 2111/60; C08G 18/10; C08G 18/3821; C08G 18/73; C08G 18/798; C08K 2201/01; C08K 3/22; C08D 7/61; E04F 15/02144; E04F 15/12; H01F 1/01; Y10T 428/31609
See application file for complete search history.

(56) References Cited

U.S. PATENT DOCUMENTS

| | | |
|---|---|---|
| 3,001,973 A | 9/1961 | Peipenbrink et al. |
| 3,124,605 A | 3/1964 | Wagner |
| 3,152,162 A | 10/1964 | Fischer et al. |
| 3,201,372 A | 8/1965 | Wagner |
| 3,394,164 A | 7/1968 | McClellan et al. |
| 3,457,210 A | 7/1969 | Markus |
| 3,632,394 A | 1/1972 | Gamier |
| 3,644,457 A | 2/1972 | Koenig et al. |
| 3,769,318 A | 10/1973 | Windemuth et al. |
| 3,832,311 A | 8/1974 | Windemuth et al. |
| 4,088,665 A | 5/1978 | Findeisen et al. |
| 4,294,719 A | 10/1981 | Wagner et al. |
| 4,344,855 A | 8/1982 | Schaefer et al. |
| 5,258,424 A | 11/1993 | Yagi et al. |
| 2003/0004367 A1 | 1/2003 | Hansen et al. |
| 2005/0252132 A1* | 11/2005 | Sieber ................ A47G 27/0437 52/411 |
| 2009/0239977 A1 | 9/2009 | Dubey et al. |
| 2014/0044879 A1 | 2/2014 | Leaman |

FOREIGN PATENT DOCUMENTS

| | | | |
|---|---|---|---|
| CN | 102477713 A | 5/2012 | |
| DE | 953012 B | 11/1956 | |
| DE | 1027394 B | 4/1958 | |
| DE | 1101394 B | 3/1961 | |
| DE | 19619012 A1 | 11/1996 | |
| EP | 0441297 A1 | 8/1991 | |
| EP | 0761842 A1 | 3/1997 | |
| EP | 1942086 A1 | 7/2008 | |
| EP | 2107081 B1 | 10/2009 | |
| EP | 2457937 A1 * | 5/2012 | ......... C08G 18/3821 |

(Continued)

Primary Examiner — Holly C Rickman
Assistant Examiner — Lisa Chau
(74) Attorney, Agent, or Firm — Berenato & White, LLC

(57) ABSTRACT

The present invention is directed to a method for providing a surface, in particular a floor surface, with a layer of a magnetic and/or magnetizable cover composition, the surface having at least one layer of cementitious material, wherein the method comprises the step of spreading the layer of the cover composition onto the surface, the cover composition comprising a polymeric binder and magnetic and/or magnetizable particles, characterized in that the layer of the cover composition has a water vapor transmission rate of at least 0.25 g h$^{-1}$ m$^{-2}$ according to ASTM D1653, and the surface and/or the layer of cementitious material has a relative humidity of more than 75% according to ASTM F 2170-11.

20 Claims, No Drawings

(56) References Cited

FOREIGN PATENT DOCUMENTS

| | | | | |
|---|---|---|---|---|
| EP | 2457937 | A1 | 5/2012 | |
| GB | 843841 | A | 8/1960 | |
| GB | 899036 | A | 6/1962 | |
| GB | 994890 | A | 6/1965 | |
| GB | 1303201 | A | 1/1973 | |
| GB | 1304836 | A | 1/1973 | |
| GB | 1337660 | A | 11/1973 | |
| WO | 9422151 | A1 | 9/1994 | |
| WO | WO-9422151 | A1 * | 9/1994 | ............ C04B 26/10 |
| WO | WO9422151 | A1 | 9/1994 | |
| WO | 2010120617 | A2 | 10/2010 | |

\* cited by examiner

MAGNETIC FLOOR SURFACE

CROSS-REFERENCE TO RELATED APPLICATIONS AND CLAIM TO PRIORITY

This application is divisional of U.S. Application Serial No. 14/406,429, filed Dec. 8, 2014, which is based upon International Application No. PCT/EP2013/061285 filed May 31, 2013, which claims priority to European Patent Application No. 12171106.3 filed Jun. 6, 2012, the disclosures of which are incorporated herein by reference and to which priority is claimed.

FIELD OF INVENTION

The present invention is directed to a method for providing a surface, in particular a floor surface having at least one layer of cementitious material with a magnetic and/or magnetizable cover composition.

BACKGROUND OF THE INVENTION

Magnetic floor coatings are known in the prior art. These floor coatings are typically applied directly in a layer thickness of, for example, 0.5 mm to a dried cementitious surface like a screed or concrete surface. Such a coated floor can be covered in the following with magnetic carpet or vinyl tiles. The magnetic interaction between the floor coating and the carpet tiles keeps the tiles fixed at their position. At the same time however, the carpet tiles can easily be exchanged, for example if the carpet is worn out or if the floor color shall simply be changed.

A coating composition suitable for such a purpose is described in EP 2 107 081 B1. This reference discloses a rubber composition for the production of an elastomer wherein the rubber composition comprises at least one rubber compound and at least one free-radical initiator. The rubber compound is cured by subjecting it to a radical cross-linking reaction. The rubber composition may further include magnetic or magnetizable particles.

It is, however, sometimes regarded as disadvantageous that the magnetic floor coating compositions which are known so far, can only be applied to dried surfaces. The ASTM F 2170-11 standard test method for determining relative humidity in concrete floor slaps, for example, states that "moisture permeating from concrete floor slabs affects the performance of flooring systems such as resilient and textile floor coverings and coatings" and that "excessive moisture permeating from floor slabs after installation can cause floor covering systems failures such as debonding and deterioration of finish flooring and coatings and microbial growth". In practice it has usually been required that the relative humidity of a cementitious surface should be 75% or lower before a floor coating may be applied. In other words, the cementitious surface such as, for example, a screed or concrete surface has to be dried for a certain period of time before a flooring coating layer such as a magnetic floor coating can be applied. This does not only include a waiting period which delays using the respective room, but also requires continuous determination of the actual humidity.

It is therefore an object of the present invention to develop a method for providing a surface with a layer of a magnetic and/or magnetizable cover composition that can be applied to cementitious surfaces with a higher level of humidity and that thus overcomes the drawbacks of the prior art.

SUMMARY OF THE INVENTION

This object is solved by a method for providing a surface, in particular a floor surface, with a layer of a magnetic and/or magnetizable cover composition, the surface having at least one layer of cementitious material, wherein the method comprises the step of spreading the layer of the cover composition onto the surface, the cover composition comprising a polymeric binder and magnetic and/or magnetizable particles, wherein the layer of the cover composition has a water-vapor transmission rate of at least $0.25$ g $h^{-1}$ $m^{-2}$ according to ASTM D1653, and the surface and/or the layer of cementitious material has a relative humidity of more than 75% according to ASTM F 2170-11.

The invention furthermore relates to a surface, in particular a floor surface comprising at least one layer of cementitious material bearing a layer of a cover composition comprising a polymeric binder and magnetic and/or magnetizable particles, wherein the layer of the cover composition has a water vapor transmission rate of at least $0.25$ g $h^{-1}$ $m^{-2}$ according to ASTM D1653, and the surface and/or the layer of cementitious material has a relative humidity of more than 75% according to ASTM F 2170-11 when the layer of the cover composition is applied.

DETAILED DESCRIPTION OF EMBODIMENTS OF THE INVENTION

The term cementitious as used above and below generally is a material that has the properties of cement. Cements are binder materials that set and harden independently, and can bind other materials together. Portland cement, for example that is widely used in the construction industry can be made by heating limestone (calcium carbonate) with small quantities of other materials (such as clay) to 1450° C. in a calcination reaction whereby carbon dioxide is released from the calcium carbonate to form calcium oxide. Calcium oxide (also referred to as quicklime) may then be blended with other materials such as fly ash or silica fume. The resulting hard substance may then be ground, for example, with a small amount of gypsum into a powder to make 'Ordinary Portland Cement', the most commonly used type of cement (often referred to as OPC).

Cementitious materials are the basic ingredients of concrete, montar, screed and the like. Concrete is a composite material comprising, in particular, cement, aggregate such as gravel and sand, and water. It has surprisingly been found that contrary to what is generally stated in the standard test method ASTM F2170-11, a magnetic and/or magnetizable cover composition having a water-vapor transmission rate of at least $0.25$ g $h^{-1}$ $m^{-2}$ according to ASTM D1653 may be applied to highly humid or wet cementitious materials. It has been realized that the cover compositions useful with the inventive method should have a high water vapor permeability so that humidity in the cementitious material is not trapped but may instead diffuse through the cover composition and thus allow the cementitious material to continue drying. Water vapor permeability of the cover composition preferably is at least 5 g mm $m^{-2}/24$ h, more preferably at least 7 g mm $m^{-2}/24$ h and especially preferable at least 8 g mm $m^{-2}/24$ h.

As a consequence of the water vapor permeability of the cover compositions disclosed herein, no delamination, blistering and the like of the layer of the cover composition from the cementitious material surface is observed. Such defects have been observed, however, for prior art compositions having a water vapor transmission rate of less than $0.25$ g $h^{-1}$ $m^{-2}$ when applied to floorings with a relative humidity of more than 75%. Without being bound to this theory, it is believed that the reason for the delamination is found in that water vapor from the wet cementitious material concentrates at the non-exposed surface of the magnetic floor coating facing the surface or the floor surface, respectively, where a transmission of the humidity into the air is blocked by the coating which finally causes blistering and thus delamination of the coating.

In a further aspect of the inventive method, the surface and/or the layer of the cementitious material preferably has a relative humidity of more than 80%, more preferably of from 82 to 98% according to ASTM F 2170-11, in particular from 85 to 95%. Even more preferred, the surface and/or the layer of cementitious material has a relative humidity from 88 to 95%, most preferred from 90 to 95%.

The surface used in the present invention has at least one layer of a cementitious material. The thickness of the layer can vary widely and range, for example, from at least 1 mm to 10 cm or more. The surface is provided by at least one layer of a cementitious material having a relative humidity as determined according to ASTM F 2170-11 of at least 75%. The surface can be provided, for example, by a screed layer which has been freshly cast or has been dried upon casting for a time insufficient for the relative humidity to drop below 75%, respectively. The surface can also be provided by a floor surface being covered with a cementitious levelling layer having a relative humidity of at least 75%. Cementitious levelling agents typically comprise an inorganic cement binder such as a hydraulic cement like Portland cement and an inorganic mineral filler such as silica sand. Cementitious levelling agents are disclosed, for example, in U.S. 2009/0,239,977.

The layer of the cover composition is preferably directly spread onto the layer of cementitious material. It is however also possible to apply a primer layer in a first step to the cementitious layer, if desired, provided, however, that the primer layer does not deteriorate the water vapor transmission characteristics of the primed cementitious surface layer to a value of less than 0.25 g h$^{-1}$ mm m$^{-2}$. However, it is typically not necessary that a primer layer is applied.

The layer of the cover composition applied to the surface has a water-vapor transmission rate of at least 0.25 g h$^{-1}$ m$^{-2}$ according to ASTM D1653, in particular at least 0.30 g h$^{-1}$ m$^{-2}$, preferably at least 0.35 g h$^{-1}$ m$^{-2}$, most preferred at least 0.4 g h$^{-1}$ m$^{-2}$. The thickness of the layer of the cover composition preferably is between 0.15 and 5 mm and more preferably between 0.25 and 2 mm.

The cover composition comprises a polymeric binder. Polymeric binders suitable in the method according to the invention comprise polyurea based binders and/or polyurethane/urea based binders. In the context of the inventive method it has been found that the polymeric binder preferably is a polyurea based binder prepared from a precursor composition comprising:

a polyisocyanate component, an amine-group containing component an optional polyol component, optionally one or more catalysts, optionally a material selected from fillers, extenders, pigments or combinations thereof.

The amine-group containing component preferably comprises a secondary amine which preferably comprises an aspartate ester or a composition of the general formula (I):

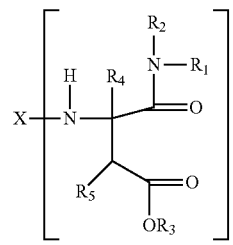

formula (I)

wherein

X is alkyl, alkylene, aryl or arylene with a valency of n, $R_1$, $R_2$, $R_4$ and $R_5$ are each independently selected from hydrogen, alkyl or aryl, $R_3$ is alkyl or aryl, n is an integer greater or equal to 1.

Even more preferred, n is 2 and X is alkylene or arylene.

An alkyl group is a paraffinic hydrocarbon group which is derived from an alkane by removing one hydrogen from the formula. The hydrocarbon group may be either linear, branched or cyclic when R, and $R_2$ are taken together with the nitrogen atom, having 1 to 20 carbon atoms. Preferably, the hydrocarbon has 1 to 5 carbon atoms.

Simple examples include methyl (—$CH_3$) and ethyl (—$CH_2CH_3$). An aryl group is an unsaturated hydrocarbon group having an aromatic ring structure characteristic of benzene, naphthalene, etc. i.e., either the six carbon ring of benzene or the condensed six carbon rings of other aromatic derivatives. The aromatic ring can be either substituted or unsubstituted. Possible substituent groups include alkyl, amino, nitro, hydroxyl, halogen and methoxy groups. A simple example of an aryl group (unsubstituted) is phenyl (—$C_6H_5$).

A polyisocyanate component contains more than one isocyanate moiety (—NCO). The polyisocyanate component preferably refers to a diisocyanate or triisocyanate.

An arylene group is a multivalent radical, which is formed by removing hydrogen from at least two carbon sites on an aromatic nucleus.

An alkylene group is an organic radical, which is formed by removing hydrogen from at least two carbon sites on an aliphatic hydrocarbon. A simple example is the ethylene radical, —$C_2H_4$—.

The secondary amines useful in the present invention may be produced via Michael-type reaction of primary amines with various amide-esters. Useful amide esters include adducts of alcohols with isomaleimides. This reaction is illustrated below providing a compound of formula (II).

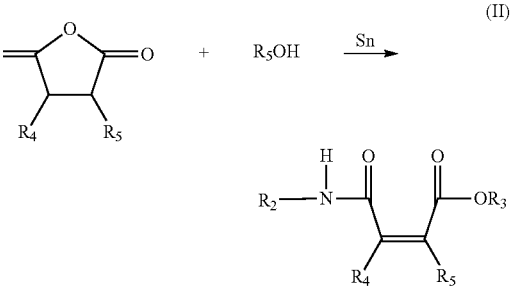

wherein $R_2$ is an alkyl group or an aryl group and $R_3$, $R_4$, and $R_5$ are as defined above.

The use of an organotin salt as a catalyst results in increased yields of the respective desired product.

The reaction of the isomaleimide with an alcohol can be carried out at from about 0° C. to about 100° C., preferably from ambient temperatures, i.e. about 20 - 25° C., to about 70° C. Examples of organotin salts employable as catalysts are dibutyltin dilaurate, dibutyltin diacetate, dimethyltin dilaurate, stannous octoate, bis(lauryldibutyltin) oxide, dibutyltin dimercaptide, and dibutyltin dimercaptide. A preferred catalyst is dibutyltin diacetate.

The amount of catalyst used may vary from about 0.1 to about 10 mole % based on the amount of alcohol. The isomaleimide starting materials can be prepared by known methods.

An alternate method of preparing amide ester precursors includes reacting a maleic anhydride with an amine followed by converting the carboxylic acid group to the desired ester. This reaction is illustrated below in (III):

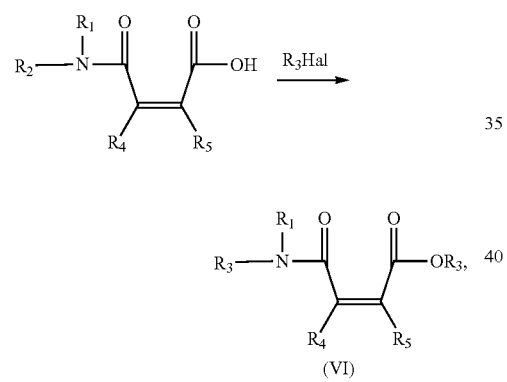

(III)

wherein $R_1$, $R_2$, $R_3$, $R_4$ and R5 are as defined above, and Hal represents a halide ion, preferably iodide.

The secondary amines, useful in the present invention can be prepared by the reaction of a primary amine with the amide-ester Michael receptor. This reaction is often spontaneous, rapid, and nearly quantitative. The adducts may be synthesized by simply allowing mixtures of primary amines and Michael receptors to stand for about 96 hours at about 70° C. in the absence of catalyst. This reaction is illustrated in the reaction scheme below and results in the aspartate ester of Formula I

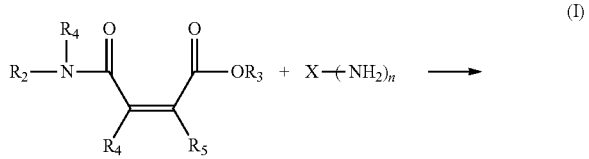

(I)

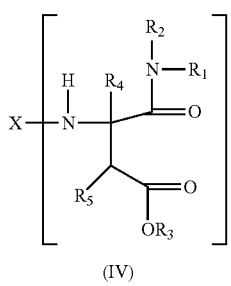

(IV)

wherein X, n and $R_1$ to $R_5$ are as defined above.

The aspartate ester of Formula I and the above reaction schemes are disclosed in U.S. 2003/0,004,367, p. 3, section [0023] to p. 4, section [0041]. This passage is included by reference herewith.

Amines useful in preparing the secondary amines include, for example, ethylene diamine, 1,2-diaminopropane, 2,5-diamino-2,5-dimethylhexane, 1,11-diaminoundecane, 1,12-diaminododecane, 2,4'-diamino-dicyclohexyl methane, 1-amino-3,3,5-trimethyl-5-aminomethylcyclohexane, 2,4- or 2,6-diaminotoluene, 2,4'- or 4,4'-diaminodiphenyl methane or mixtures thereof. Preferred amines include 1,4-diaminobutane, 1,6-diaminohexane, 2,4,4-trimethyl- 1,6-diaminohexane, 1-amino-3,3,5-trimethyl-5-aminomethyl-cyclohexane, 4,4'-diamino-dicyclohexyl methane, 3,3-dimethyl-4,4'-diamino-dicyclohexyl methane or mixtures thereof. Especially preferred amines include 4,4'-methylene-bis(cyclohexylamine), 2-methyl-1,5-pentanediamine, 1,6-diaminohexane and mixtures thereof.

The reaction generally proceeds to 80-99% completion within 96 hours. Since the reactions are clean, purification of the reaction products is not necessary.

The amine-group containing component preferably comprises an aspartic ester amine of the following Formula V

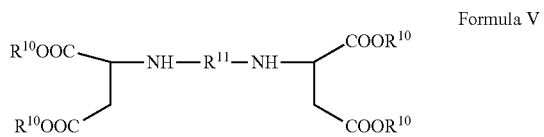

Formula V wherein $R^{11}$ is a divalent organic group (up to 40 carbon atoms), and each $R^{10}$ is independently an organic group inert toward isocyanate groups at temperatures of 100° C. or less.

In the above formula V, preferably, $R^{11}$ is an aliphatic group (preferably, having 1-20 carbon atoms), which can be branched, unbranched, or cyclic. More preferably, $R^{11}$ is selected from the group of divalent hydrocarbon groups obtained by the removal of the amino groups from 1,4-diaminobutane, 1,6-diaminohexane, 2,2,4-and 2,4,4-trimethyl-I,6-diaminohexane, 1-amino-3,3,5-trimethyl-5-aminomethyl-cyclohexane, 4,4'-diamino-dicyclohexyl methane or 3,3-dimethyl-4,4'-diamino-dicyclohexyl methane.

In some embodiments, $R^{11}$ preferably comprises a dicyclohexyl methane group or a branched C4 to C12 group. R2 is typically independently a lower alkyl group (having 1-4 carbon atoms).

In the above formula V, $R^{10}$ preferably is alkyl or aryl with alkyl or aryl having the preferred meaning given for formula I above.

The aspartic ester amines of formula V are disclosed in WO 2010/120,617, p. 5, ln. 19 - p. 7, ln. 8. This section is included by reference in the present specification.

Suitable aspartic acid esters are commercially available from Bayer Corp. under the trade designations "Desmophen NH 1420", "Desmophen NH 1520" and "Desmophen 15 NH 1220".

Desmophen NH 1420 IS substantially composed of the following compound Formula V.1;

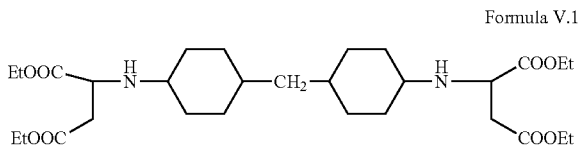 [SMILES: CCOC(=O)CC(NC1CCC(CC2CCC(NC(CC(=O)OCC)C(=O)OCC)CC2)CC1)C(=O)OCC]

Formula V.1

Desmophen NH1520 is substantially composed of the following compound Formula V.2;

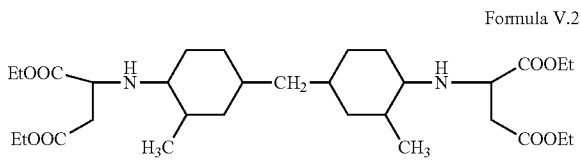

Formula V.2

Desmophen NH1220 is substantially composed of the following compound Formula V.3

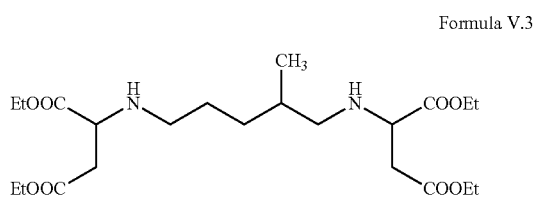 [SMILES: CCOC(=O)CC(NCCCC(C)CNC(CC(=O)OCC)C(=O)OCC)C(=O)OCC]

Formula V.3 wherein in each of Formulas V.1 - V.3, Et is ethyl.

The polyurea binder compositions useful for the inventive method comprise a polyisocyanate component and an amine component, which preferably contains at least one component corresponding to the secondary amines as defined above.

Polyisocyanates include compounds bearing at least one isocyanate group. Suitable low molecular weight polyisocyanates having a molecular weight between 168 and 5000 include hexamethylene diisocyanate, 2,2,4- and/or 2,4,4-trimethyl -1,6-hexamethylene diisocyanate, dodecamethylene diisocyanate, 1,4-diisocyanatocyclohexane, I -isocyanato-3,3,5-trimethyl-5-isocyanatomethylcyclohexane (IPDI), 2,4'-and/or 4,4'-diisocyanato -dicyclohexyl methane, 2,4'-and 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds.

It is preferred, however, to use derivatives of these monomeric polyisocyanates. These derivatives include polyisocyanates containing biuret (carbamylurea) groups as described, for example, in U.S. Pat. No. 3,124,605, U.S. Pat. No. 3,201,372 DE 1,101,394; polyisocyanates containing isocyanurate groups as described, for example, in U.S. Pat. No. 3,001,973, DE 1,022,789, DE 1,333,067, DE 1,027,394, DE 1,929,034 and DE 2,004,048; polyisocyanates containing urethane groups as described, for example, in DE 953,012, BE 752,261, U.S. Pat. No. 3,394,164 and U.S. Pat. No. 3,644,457; polyisocyanate containing carbodiimide groups as described in DE 1,092,007, U.S. Pat. No. 3,152,162, DE 2,504,400, DE 2,537,685 and DE 2,552,350; and polyisocyanates containing allophanate groups as described, for example, in GB 994,890, BE 761,626 and NL 7,102,524.

Preferably the polyisocyanates are polyisocyanate resins based on hexamethylene diisocyanate (HDI).

The polyisocyanate component preferably has an average NCO-functionality of 1.5 to 4, in particular from 1.8 to 3.

Isocyanate group-containing prepolymers and semi-prepolymers which are obtainable from the optionally substituted monomeric polyisocyanates exemplified above and organic polyol compounds are also suitable for use as the polyisocyanate component. These prepolymers and semi-prepolymers may generally have about 140-8400 equivalent weight, preferably about 210-420 equivalent weight. They are prepared, for example, by the reaction of the above mentioned starting materials at an NCO/OH equivalent ratio of about 1.05:1 to 10:1 preferably about 1.1:1 to 3:1, this reaction being optionally followed by distillative removal of any unreacted volatile starting polyisocyanates still present.

The prepolymers and semi-prepolymers may be prepared from low molecular weight polyol compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The prepolymers and semi-prepolymers are, however, preferably prepared from relatively high molecular weight polyol compounds which have a number average molecular weight of 2000 to about 10000, preferably about 3000 to 9000, as determined by the functionality and the OH number. These polyol compounds have at least two hydroxyl groups per molecule and generally have a hydroxyl group content of about 0.5 to 17% by weight.

The polyisocyanate component preferably comprises one or more polyisocyanate prepolymers derived from the uretdione, the biuret or the isocyanurate of hexamethylene di-isocyanate (HDI) blended with a member of the group consisting of the uretdione, the biuret or the isocyanurate of HDI. These at least one polyisocyanate prepolymers preferably each have an (NCO)content of 5-15% by weight relative to the mass of the prepolymers.

The polyisocyanate component preferably comprises at least one polyisocyanate prepolymer derived from the isocyanurate trimer of HDI, blended with the uretdione of HDI.

The polyol component is preferably selected from polyester polyols, polyether polyester polyols, polyether polyols or combinations thereof. Examples of suitable relatively high molecular weight polyol compounds which may be used for the preparation of the prepolymers and semi-prepolymers include the polyester polyols based on the previously described low molecular weight, monomeric alcohols and polybasic carboxylic acids such as adipic acid, sebacic acid, phthalic acid, isophthalic acid, tetra-hydrophthalic acid, hexahydrophthalic acid, maleic acid, the anhydrides of these acids and mixtures of these acids and/or acid anhydrides. Hydroxyl group-containing polylactones, especially poly-e-caprolactones, are also suitable for the preparation of the prepolymers and semi-prepolymers.

Polyether polyols, which are obtained in known manner by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and any mixtures of these starting molecules. Ethylene oxide and/or propylene oxide are particularly suitable alkylene oxides for the alkoxylation reaction. These alkylene oxides may be introduced into the alkoxylation reaction in any sequence or as a mixture.

Also suitable for the preparation of the prepolymers and semi-prepolymers are the hydroxyl group-containing polycarbonates which may be prepared by the reaction of the previously described monomeric diols with phosgene and diaryl carbonates such as diphenyl carbonate.

The polymeric binder may further comprise organic polyol compounds and include both the low molecular weight polyol compounds and the relatively high molecular weight polyol compounds previously set forth for the preparation of the prepolymers and semi-prepolymers suitable for use as the polyisocyanate component.

According to a further preferred embodiment of the inventive method, the polyol component has an average OH-functionality of 1.5 to 4, in particular from 2 to 3.

The coating composition useful in the method according to the invention may include one or more catalysts. A catalyst will typically be added in case the composition comprises a polyol. Useful catalysts include organotin salts, such as dibutyltin dilaurate, dibutyltin diacetate, dimethyltin dilaurate, stannous octoate, bis(lauryldibutyltin) oxide, dibutyltin dimercaptide, and dibutyltin dimercaptide.

The coating compositions to be used for the process according to the invention may also contain other auxiliary agents and additives conventionally used in polyurea and/or polyurethane/urea coatings, in particular pigments, fillers, levelling agents, antisettling agents, antioxidants, UV stabilizers, solvents and the like.

Suitable solvents are those known from polyurea chemistry and include esters, ketones and aromatic hydrocarbons.

In the coating compositions, the ratio by weight of the total quantity of binder components to the quantity of solvent is particularly about 60:40 to 100:0, preferably about 80:20 to 100:0.

The properties of the coatings obtained by the process as described above may be adjusted in particular by suitable choice of the nature and proportions of the starting components.

The cover composition comprises magnetic and/or magnetizable particles which are selected from paramagnetic, superparamagnetic and/or ferromagnetic substances, in particular from the group comprising iron, iron oxides, especially mixed iron oxides with other metal oxides from the transition elements group like iron-nickel oxides, ferrosilicones or combinations thereof.

A particularly preferred embodiment of the inventive method is characterized in that the magnetic and/or magnetizable particles have an average particle diameter from 1 nm to 1.000 μm, in particular from 50 nm to 500 μm.

The cover composition typically comprises from 25 to 50 wt.-% of polymeric binder, from 50 to 75 wt.-% magnetic and/or magnetizable particles and optionally up to 5 wt.-% additives like fillers, extenders, pigments, plasticizers, rheology modifiers, thickeners, solvents, tackifiers, UV-stabilizers or combinations thereof.

For carrying out the method according to the invention, the coating compositions to be used according to the invention are applied as one or more layers to the substrate by known methods such as brush coating or by means of roller, squeegee, trowel or doctor blade applicators.

The method according to the invention is suitable for the formation of coatings on a surface, e.g. a cementitious surface. The method is particularly useful for coating a floor surface, in particular a floor surface having a cementitious layer having a relative humidity of at least 75%, preferably more than 80%, more preferably from 82 to 98% according to ASTM F 2170-11, in particular from 85 to 95%. Even more preferred, the surface and/or the layer of cementitious material has a relative humidity from 88 to 95%, most preferred from 90 to 95%.

After the cementitious substrate has been coated, the coatings are dried and cured at a temperature of about −5° C. to 40° C. Curing is preferably carried out at a temperature between 10° C. and 30° C.

The present invention is described in more detail with the following examples.

EXAMPLES

1. Materials Used a. Magnetic Additive:

Ferrosilicon Cyclone 60: Atomized Ferrosilicon 15%, available from M&M Alloys

Technical Datasheet:

| Element | Specification, % |
|---|---|
| Bulk chemical composition | |
| Silicon | 14-16 |
| Iron | 80 min |
| Carbon | 0.5 max |
| Aluminium | 0.04 typical |
| Titanium | 0.05 typical |
| Physical Properties | |
| Relative density | 6.7-7.1 g/ml |
| Apparent density | 3.3-4.0 g/ml |

| Particle Size (microns) | % Cumulative Passing Typical |
|---|---|
| Particle Size Distribution (fine) | |
| 355 | 99 |
| 150 | 95 |
| 106 | 87 |
| 75 | 75 |
| 63 | 67 |
| 45 | 54 |
| Limits-45 | 45-65 |
| Particle Size Distribution (coarse) | |
| 355 | 99 |
| 150 | 90 |
| 106 | 83 |
| 75 | 68 |
| 63 | 59 |
| 45 | 38 |
| Limits-45 | 32-42 |
| Particle Size Distribution (Cyclone 60) | |
| 355 | 100 |
| 150 | 99 |
| 106 | 97 |
| 75 | 90 |
| 63 | 83 |
| 45 | 70 |
| Limits-45 | 65-75 | b. Polyurea Binder.

A two part aspartate-ester polyurea (AE-PUREA) binder composition was prepared.

AE-PUREA—Part A

| Trade name | Composition | Amount (% wt) | Available from |
|---|---|---|---|
| Desmophen NH 1420 | Amino functional reactant | 90.92 | Bayer |
| Agitan DF 6420 | Defoamer | 1.82 | Univar |
| BYK A530 | Anti foaming agent | 1.82 | Blagden Chemicals or BYK |
| BYK 340 | Polyether modified siloxane wetting agent | 0.14 | Blagden Chemicals or BYK |
| Sylosiv A3 | micronized, highly porous, crystalline aluminosilicate | 2.66 | Grace Davison |
| Cab-o-sil TS720 | Treated fumed silica (medium surface area) | 2.64 | Univar or Cabot Corporation |

AE-PUREA—Part B.

| Trade name | Composition | Amount (% wt) | Available from |
|---|---|---|---|
| Desmodur N3400 | solvent-free aliphatic polyisocyanate resin based on hexamethylene diisocyanate (HDI) | 75 | Bayer |
| Desmodur XP 2599 | Aliphatic, HDI based prepolymer having ether groups | 25 | Bayer |

A polyurea binder coating composition was prepared by blending Part A and part B of the AE-PUREA in a ratio of 1.35:1(volume) or 100:79(weight).

c. Comparative Epoxy Binder

Epoxy binder used in comparative example C-1: 3M Scotchkote Epoxy coating 162CR, commercially available from 3M. The epoxy binder is a solvent free (100% solids) epoxy coating having a water vapor permeability of 1.2 g·mm·m-2/24 h. For a nominal 0.5 mm thickness film, this equates to a water vapor transmission rate of 0.1 g h–1 m–2.

2. Test Methods a. Water Vapor Transmission

The water vapor transmission characteristics of the compositions were assessed in accordance with ASTM D1653—"Standard Test Methods for Water Vapor Transmission of Organic Coating Films"—using Test Method B(Wet Cup Method). All tests were carried out in duplicate.

b. Adhesion

The adhesion was measured via direct pull method according to ASTM 4541. The adhesion values are reported in Mpa.

3. Example 1, Reference Example Ref-1 and Comparative Example C-1

Examples 1 (a) and 1(b) were made by blending Ferrosilicon Cyclone 60 (Fe) with the AE-PUREA coating mixture in a ratio of 4.5 kg Fe to 2.52 kg of polyurea binder composition (part A+B). The composition contained 64.1% by weight of Fe based on the total weight of the coating composition). Reference examples Ref-1 (a) and Ref-1 (b) were made without magnetic particles. Comparative example C-1 was made with 3M Scotchkote Epoxy coating 162CR. The coating compositions were coated and dried at room temperature. The final coating thickness is recorded in the tables below.

Water Vapor Transmission Test:

The coatings of example 1 and Reference example Ref-1 were tested for water vapor transmission. The results are given in tables 1 to 4.

TABLE 1 water vapor transmission tests for Example 1

| | Sample | | | |
|---|---|---|---|---|
| | Example 1 (a) | | Example 1 (b) | |
| | Film thickness (cm) | | | |
| | 0.07 | wt. Diff | 0.08 | wt. Diff |
| Start weight. | 111.88 | | 103.61 | |
| Day 1 | 111.84 | 0.04 | 103.570 | 0.04 |
| 2 | 111.82 | 0.02 | 103.53 | 0.04 |
| 3 | 111.82 | 0 | 103.52 | 0.01 |
| 6 | 111.78 | 0.04 | 103.49 | 0.03 |
| 7 | 111.77 | 0.01 | 103.44 | 0.05 |
| 9 | 111.75 | 0.02 | 103.39 | 0.05 |
| 10 | 111.75 | 0 | 103.37 | 0.02 |
| 13 | 111.73 | 0.02 | 103.37 | 0 |
| 15 | 111.68 | 0.05 | 103.31 | 0.06 |
| 17 | 111.67 | 0.01 | 103.3 | 0.01 |
| 20 | 111.64 | 0.03 | 103.28 | 0.02 |
| 22 | 111.59 | 0.05 | 103.25 | 0.03 |
| 24 | 111.54 | 0.05 | 103.2 | 0.05 |
| 27 | 111.51 | 0.03 | 103.16 | 0.04 |
| 28 | 111.51 | 0 | 103.15 | 0.01 |
| Total wt loss/g | 0.37 | | 0.46 | |
| Time elapsed/h | 672 | | 672 | |

The test area was 0.000963 m$^2$.
The results are summarized in table 2:

TABLE 2 water vapor transmission test Ex 1: summary

| Ex 1 (a) | Water vapour transmission rate | 0.572 | g h$^{-1}$ m$^{-2}$ |
|---|---|---|---|
| | Water vapour permeability | 9.600 | g · mm · m$^{-2}$/24 h |
| Ex 1 (b) | Water vapour transmission rate | 0.711 | g h$^{-1}$ m$^{-2}$ |
| | Water vapour permeability | 13.600 | g · mm · m$^{-2}$/24 h |
| Average Ex 1 | Water vapour permeability | 11.600 | g · mm · m$^{-2}$/24 h |

TABLE 3 water vapor transmission tests for Ref-1

| | Sample | | | |
|---|---|---|---|---|
| | Ref-1 (a) | | Ref-1 (b) | |
| | Film thickness (cm) | | | |
| | 0.045 | wt. Diff | 0.035 | wt. Diff |
| Start weight. | 102.04 | | 108.25 | |
| Day 1 | 102.01 | 0.03 | 108.200 | 0.05 |
| 2 | 101.97 | 0.04 | 108.17 | 0.03 |
| 5 | 101.91 | 0.06 | 108.09 | 0.08 |
| 6 | 101.89 | 0.02 | 108.05 | 0.04 |
| 7 | 101.89 | 0 | 108.03 | 0.02 |
| 9 | 101.75 | 0.14 | 107.94 | 0.09 |
| 12 | 101.68 | 0.07 | 107.89 | 0.05 |

TABLE 3-continued water vapor transmission tests for Ref-1

| | Sample | | | |
|---|---|---|---|---|
| | Ref-1 (a) | | Ref-1 (b) | |
| | Film thickness (cm) | | | |
| | 0.045 | wt. Diff | 0.035 | wt. Diff |
| 13 | 101.67 | 0.01 | 107.89 | 0 |
| 14 | 101.6 | 0.07 | 107.84 | 0.05 |
| 16 | 101.49 | 0.11 | 107.84 | 0 |
| 21 | 101.38 | 0.11 | 107.76 | 0.08 |
| 22 | 101.31 | 0.07 | 107.68 | 0.08 |
| 23 | 101.27 | 0.04 | 107.68 | 0 |
| 26 | 101.2 | 0.07 | 107.63 | 0.05 |
| 27 | 101.17 | 0.03 | 107.62 | 0.01 |
| 28 | 101.13 | 0.04 | 107.59 | 0.03 |
| Total wt loss/g | | 0.91 | | 0.66 |
| Time elapsed/h | | 672 | | 672 |

The test area was 0.000963 m$^2$.

The results are summarized in the table 4:

TABLE 4 water vapor transmission test Ref-1: summary

| Ref-1 (a) | Water vapour transmission rate | 1.407 g h$^{-1}$ m$^{-2}$ |
|---|---|---|
| | Water vapour permeability | 15.200 g · mm · m$^{-2}$/24 h |
| Ref-1 (b) | Water vapour transmission rate | 1.020 g h$^{-1}$ m$^{-2}$ |
| | Water vapour permeability | 8.600 g · mm · m$^{-2}$/24 h |
| Average Ref-1 | Water vapour permeability | 11.900 g · mm · m$^{-2}$/24 h |

From the above results it can be seen that the inclusion of the ferrosilicon additive has minimal impact on the inherent water vapour transmission characteristics of the AE-PUREA coating, thus affording a magnetic and/or magnetisable floor covering composition with a high level of water vapour permeability.

Adhesion Tests:

In order to perform adhesion tests, polymer screed blocks were prepared which had been sealed on all but 1 face, using multiple coats of an epoxy coating (3M Scotchkote Epoxy Coating 162CR). The blocks were saturated with water (moisture content >95%) or left dry (moisture content >10%). Then, the final "test" face was coated with the respective coating composition (coating from ex 1, REF-1 and C-1).

The weight of each test panel was recorded before and after testing and the level of adhesion was measured via direct pull method according to ASTM 4541. The results are recorded in table 5. In each case the failure method was a cohesive failure within the polymer screed.

TABLE 5

Moisture content and adhesion

| Moisture content of screed block prior to coating(%) | Coating | Weight difference after 21 days in 40 c. storage (g) | Level of coating adhesion (Mpa) |
|---|---|---|---|
| >95 | Ref-1 | −11.16 | 3.4 |
| >95 | Ex 1 | −9.81(*) | 3.6 |
| >95 | C-1 | −2.04(*) | 2.8 |
| <10 | Ex 1 | −1.47 | 3.6 |

(*)mean value of 2 tests

The testing shows that the moisture loss of the saturated blocks was much higher when coated with either the AE-PUREA coatings of ex 1 or of Ref-1 when compared to the comparative epoxy coating, showing that these coatings are allowing water vapor to pass through.

The results also show that the level of adhesion of the AE-PUREA coating used for the inventive method is not affected by the moisture content of the block. Also shown is that the moisture trapped in the screed by the comparative epoxy coating has lowered the cohesive strength of the polymer screed.

We claim:

1. A floor surface comprising at least one layer of cementitious material bearing a layer of a cover composition comprising a polymeric binder and magnetic and/or magnetizable particles, wherein the layer of the cover composition has a water vapor transmission rate of at least 0.25 g h$^{-1}$ m$^{-2}$ according to ASTM D1653, wherein the at least one layer of cementitious material has a cementitious surface, and wherein the cementitious surface and/or the at least one layer of cementitious material has a relative humidity of more than 75% according to ASTM F 2170-11 when the layer of the cover composition is applied.

2. A floor surface, comprising:
   at least one layer of cementitious material having a cementitious surface; and
   a layer of a cover composition applied on the cementitious surface of the at least one layer of cementitious material, the layer of the cover composition having a water vapor transmission rate of at least 0.25 g h$^{-1}$ m$^{-1}$ according to ASTM D1653, the cover composition comprising
   a polymeric binder and
   magnetic particles, magnetizable particles or a combination of magnetic and magnetizable particles,
   wherein the at least one layer of cementitious material, the cementitious surface or a combination of the at least one layer of cementitious material and the cementitious surface has a relative humidity of more than 75% according to ASTM F 2170-11 when the layer of the cover composition is applied on the cementitious surface of the at least one layer of cementitious material.

3. The floor surface according to claim 2, wherein the at least one layer of cementitious material, the cementitious surface or the combination of the at least one layer of cementitious material and the cementitious surface has a relative humidity in a range of 80 to 98% according to ASTM F 2170-11 when the layer of the cover composition is applied on the surface of the at least one layer of cementitious material.

4. The floor surface according to claim 2, wherein the at least one layer of cementitious material, the cementitious surface or the combination of the at least one layer of cementitious material and the cementitious surface has a relative humidity in a range of 85 to 95% according to ASTM F 2170-11 when the layer of the cover composition is applied on the at least one layer of cementitious material.

5. The floor surface according to claim 2, wherein the layer of the cover composition is spread on the at least one layer of cementitious material.

6. The floor surface according to claim 2, wherein the layer of the cover composition has a water vapor transmission rate according to ASTM D1653 of at least $0.30 \text{ g h}^{-1} \text{ m}^{-2}$.

7. The floor surface according to claim 2, wherein the layer of the cover composition has a water vapor transmission rate according to ASTM D1653 of at least $0.4 \text{ g h}^{-1} \text{ m}^{-2}$.

8. The floor surface according to claim 2, wherein the polymeric binder is prepared from a precursor composition comprising:
A) a polyisocyanate component,
B) an amine-group containing component,
C) optionally a polyol component,
D) optionally one or more catalysts, and
E) optionally a material selected from fillers, extenders, pigments or combinations thereof.

9. The floor surface according to claim 8, wherein the polyisocyanate component has an average NCO-functionality of 1.5 to 4.

10. The floor surface according to claim 9, wherein the polyisocyanate component comprises a polyisocyanate prepolymer derived from or blended with an uretdione, a biuret or an isocyanurate of hexamethylene di-isocyanate (HDI) or any combination thereof.

11. The floor surface according to claim 10, wherein the polyisocyanate prepolymer has an isocyanate (NCO) content of 5-15% by weight.

12. The floor surface according to claim 9, wherein the polyisocyanate component comprises a polyisocyanate prepolymer derived from an isocyanurate trimer of hexamethylene di-isocyanate (HDI), blending with an uretdione of the HDI.

13. The floor surface according to claim 8, wherein the amine-group containing component is an aspartate ester or a composition of the general formula I:

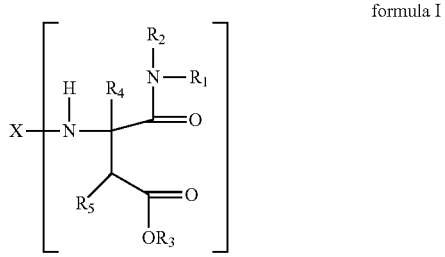

formula I wherein
X is alkyl, alkylene, aryl or arylene with a valency of n,
$R_1$, $R_2$, $R_4$ and $R_5$ are each independently selected from hydrogen, alkyl or aryl,
$R_3$ is alkyl or aryl, and
n is an integer greater than or equal to 1.

14. The floor surface according to claim 13, wherein n is 2 and X is alkylene or arylene.

15. The floor surface according to claim 8, wherein the amine-group containing component is an aspartic ester or a composition of the general formula V

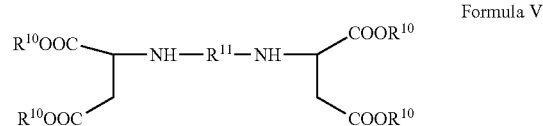

Formula V wherein $R^{11}$ is an aliphatic group of 1-20 carbon atoms and $R^{10}$ is alkyl or aryl.

16. The floor surface according to claim 8, wherein the optional polyol component has an average OH-functionality of 2 to 4.

17. The floor surface according to claim 8, wherein the optional polyol component has a number average molecular weight of 2000 to 10000 g/mol.

18. The floor surface according to claim 8, wherein the optional polyol component is selected from polyester polyols, polyether polyester polyols, polyether polyols or combinations thereof.

19. The floor surface according to claim 2, wherein the magnetic particles, the magnetizable particles or the combination of magnetic and magnetizable particles are selected from iron, iron oxides, and iron oxides mixed with other metal oxides from a transition elements group.

20. The floor surface according to claim 2, wherein the magnetic particles, the magnetizable particles or the combination of magnetic and magnetizable particles have an average particle diameter from 1 nm to 1.000 μm.

* * * * *